United States Patent
Ori (10) Patent No.: US 6,670,980 B1
(45) Date of Patent: Dec. 30, 2003

(54) LIGHT-SCANNING OPTICAL SYSTEM

(75) Inventor: Tetsuya Ori, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/276,119

(22) Filed: Mar. 25, 1999

(30) Foreign Application Priority Data

Mar. 30, 1998 (JP) .......................................... 10-101978

(51) Int. Cl.$^7$ ................................................. B41J 2/45
(52) U.S. Cl. ....................... 347/261; 347/238; 347/241; 347/256
(58) Field of Search ................................. 347/261, 238, 347/241, 244, 256

(56) References Cited

U.S. PATENT DOCUMENTS 5,343,325 A * 8/1994 Yamakawa .................... 359/205
6,473,178 B2 * 10/2002 Shimaoka .................... 356/336

FOREIGN PATENT DOCUMENTS

| JP | 50215986 A | 9/1993 | ........... G02B/21/10 |
| JP | 06018803 A | 1/1994 | ........... G02B/28/10 |

* cited by examiner

Primary Examiner—Lamson Nguyen
(74) Attorney, Agent, or Firm—Snider & Associates; Ronald R. Snider

(57) ABSTRACT

A light-scanning optical system having a function of correcting surface tilt comprises a light source 11; a first optical means 1; a light-deflecting means 14 for reflecting and deflecting a luminous flux by its deflecting/reflecting surface 15 so as to scan a surface to be scanned 18; a first lens 16 having a positive refracting power in each of the main scanning and sub-scanning directions, in which each of both sides is made of a toric surface; and a second lens 17 having a small negative refracting power, in which each of both sides is made of an aspheric surface. A semiconductor laser having a wavelength of 500 nm or shorter is used as the light source. The first and second lenses 16, 17 may be made of plastic. Thus, in a simple configuration, the light-scanning optical system can reduce its size and cost, while being able to respond to higher image density.

3 Claims, 6 Drawing Sheets

FIG. 3A
EXAMPLE 1

FIG. 3B
EXAMPLE 1

FIG. 3C
EXAMPLE 1

FIG. 4A
EXAMPLE 2
SPHERICAL ABERRATION

FIG. 4B
EXAMPLE 2
DISTORTION

FIG. 4C
EXAMPLE 2

FIG.5A
EXAMPLE 3
SPHERICAL ABERRATION

FIG.5B
EXAMPLE 3
DISTORTION

FIG.5C
EXAMPLE 3

FIG. 7A
EXAMPLE 1

FIG. 7B
EXAMPLE 2

FIG. 7C
EXAMPLE 3

FIG. 7D
EXAMPLE 4

LIGHT-SCANNING OPTICAL SYSTEM

RELATED APPLICATIONS

This application claims the priority of Japanese Patent Application No. 10-101978 filed on Mar. 30, 1998, which is incorporated herein by reference.

BACKGROUND OF THE INVENTION

1. Field of the Invention

The present invention relates to a light-scanning optical system; and, in particular, to a light-scanning optical system equipped with a function of correcting, when a luminous flux emitted from a light source is reflected and deflected by light-deflecting means such as polygon mirror so as to scan a surface to be scanned, the unevenness in pitches caused by the surface tilt of the light-deflecting means.

2. Description of the Prior Art

There have conventionally been known light-scanning optical systems such as laser printer and digital copier which scan a surface to be scanned such as a photosensitive material with a light beam such as laser beam so as to form an image on this surface. Such a light-scanning optical system comprises light-deflecting means such as rotary polygon mirror for reflecting and deflecting the light beam emitted from the light source so as to scan the surface to be scanned, and a scanning and imaging optical system for forming an image of the light beam onto the surface to be scanned.

In such a light-scanning optical system, when an unevenness in inclination (surface tilt) exists among the deflecting/reflecting surfaces of the light-deflecting means with respect to the surface to be scanned, then the imaging position of the light beam may fluctuate among scanning lines in the direction (sub-scanning direction) substantially orthogonal to the main scanning direction on the surface to be scanned, thus generating an unevenness in pitches, whereby favorable images may not be obtained. Therefore, various kinds of light-scanning optical systems equipped with a function of correcting the surface tilt of the deflecting means have been known.

For example, there has been known a light-scanning optical system equipped with a function of correcting the surface tilt, in which, in first optical means, a luminous flux from a light source is made substantially parallel by a collimating lens and then is condensed along the sub-scanning direction in the vicinity of a deflecting/reflecting surface of light-deflecting means by a cylindrical lens or the like so as to form a linear image along the main scanning direction, and the luminous flux deflected and reflected by the deflecting/reflecting surface is focused by second optical means located downstream the light-deflecting means onto the surface to be scanned. In the light-scanning optical system equipped with this surface-tilt-correcting function, an fθ lens system is widely used for the second optical means and has a function of focusing the luminous flux from the light source as a light spot onto the surface to be scanned and a function of moving this light spot at a constant speed on the surface to be scanned. Such second optical means is often constituted such that the position of the deflecting point on the deflecting/reflecting surface and the position of the imaging point on the surface to be scanned are substantially conjugate with each other in the sub-scanning direction.

In recent years, there have been demands for such a light-scanning optical system having a surface-tilt-correcting function to reduce the number of components and facilitate its manufacture.

For example, in the light-scanning apparatus disclosed in Japanese Unexamined Patent Publication No. 6-18803, a single spherical lens or an aspherical plastic lens, a plano-convex cylindrical lens having a positive refracting power only in the main scanning direction, and a concave cylindrical mirror having a negative refracting power only in the sub-scanning direction are disposed between light-deflecting means and a surface to be scanned, whereby the surface tilt is corrected with a small number of components which are easy to process.

Recently, in addition to such simplification of the structure, there have also been demands for attaining a smaller size in the light-scanning optical system, or a higher density in its forming image quality so as to improve the accuracy of image. Also, there is an important demand for reducing the cost. However, it is difficult to realize these demands at the same time.

For example, in order to reduce the size of the light-scanning optical system, it is required for the scanning lens, even in its peripheral portion, to minimize its aberration and have a wide scanning angle, whereby the scanning lens tends to become an optical system composed of a large number of elements.

The higher density in image quality specifically refers to the fact that the demanded performance has recently shifted to a printing function on the order of 1000 dots per inch from the conventional function on the order of 600 dots per inch. Thus, the conventional light-scanning optical systems have been failing to respond to such a demand. It is critical to a higher density in image quality that the size of the light spot be made smaller on the surface to be scanned. As a means therefor, a lens having a large aperture may be used. The resulting configuration contradicts the reduction in size of the optical system, and it is difficult to lower the cost thereof since the scanning lens becomes complicated.

On the other hand, it has been proposed to use plastic lenses so as to reduce the number of lenses or simplify the configuration in general. This is also advantageous in lowering the cost. Nevertheless, since favorable performances are hard to attain in the peripheral portion of a plastic lens, it is difficult to broaden the aperture relative to the lens diameter. Hence, it becomes difficult to achieve a smaller size when the aperture is broadened so as to attain a higher density as mentioned above.

Also, while the above-mentioned light-scanning apparatus disclosed in Japanese Unexamined Patent Publication No. 6-18803 uses an anamorphic mirror or lens such as cylindrical lens for correcting the surface tilt, such a mirror or lens is positioned relatively near the surface to be scanned in order to keep the image surface curvature favorable in the sub-scanning direction. As a consequence, the mirror or lens has a form elongated in the main scanning direction. As the mirror or lens that is hard to process becomes larger, the product is more likely to increase its cost. Hence, there is a demand for further simplifying the optical system and lowering its cost.

SUMMARY OF THE INVENTION

In view of such circumstances, it is an object of the present invention to provide a light-scanning optical system which has a surface-tilt-correcting function with a small number of constituent lens elements and can respond to higher image density.

It is another object of the present invention to provide a light-scanning optical system which can reduce its size and cost while using a plastic lens.

A first light-scanning optical system in accordance with the present invention comprises:

a light source;

first optical means for forming a linear image of a light beam from the light source;

light-deflecting means, having a light-deflecting surface at or near an imaging position of the first optical means, for deflecting the light beam so as to scan a surface to be scanned; and second optical means for causing the light beam deflected by the light-deflecting means to form an image on the surface to be scanned and scan the surface at substantially a constant speed;

wherein the second optical means is constituted, successively from the light-deflecting means side, by:

a first lens having a positive refracting power on each of main scanning and sub-scanning directions, each of both sides thereof having a toric surface; and a second lens having a small negative refracting power or no refracting power in the main scanning direction, at least one surface thereof being made of a non-arc surface whose cross section in the main scanning direction is represented by a function of higher order.

Alternatively, at least one surface of the second lens may be made of an aspheric surface which is of rotational symmetry.

Preferably, a semiconductor laser having a wavelength of 500 nm or shorter is employed as the light source.

A second light-scanning optical system in accordance with the present invention comprises:

a light source using a semiconductor laser having a wavelength of 500 nm or shorter;

first optical means for forming a linear image of a light beam from the light source;

light-deflecting means, having a light-deflecting surface at or near an imaging position of the first optical means, for deflecting the light beam so as to scan a surface to be scanned; and second optical means, including at least one plastic lens, for causing the light beam deflected by the light-deflecting means to form an image on the surface to be scanned and scan the surface at substantially a constant speed.

Here, the above-mentioned "main scanning direction" refers to a direction parallel to the locus of the deflected light beam on the surface to be scanned, the above-mentioned "sub-scanning direction" refers to a direction substantially orthogonal to the main scanning direction on the surface to be scanned, and the above-mentioned "cross section in the main scanning direction" refers to the cross section in the main scanning direction including the optical axis.

The above-mentioned "toric surface" refers to a surface in which the cross section in the main scanning direction and the surface (sub-scanning direction), perpendicular to the cross section in the main scanning direction, including the optical axis have refracting powers different from each other.

DESCRIPTION OF THE PREFERRED EMBODIMENTS

In the following, embodiments of the present invention will be explained with reference to the accompanying drawings.

Figure 1:
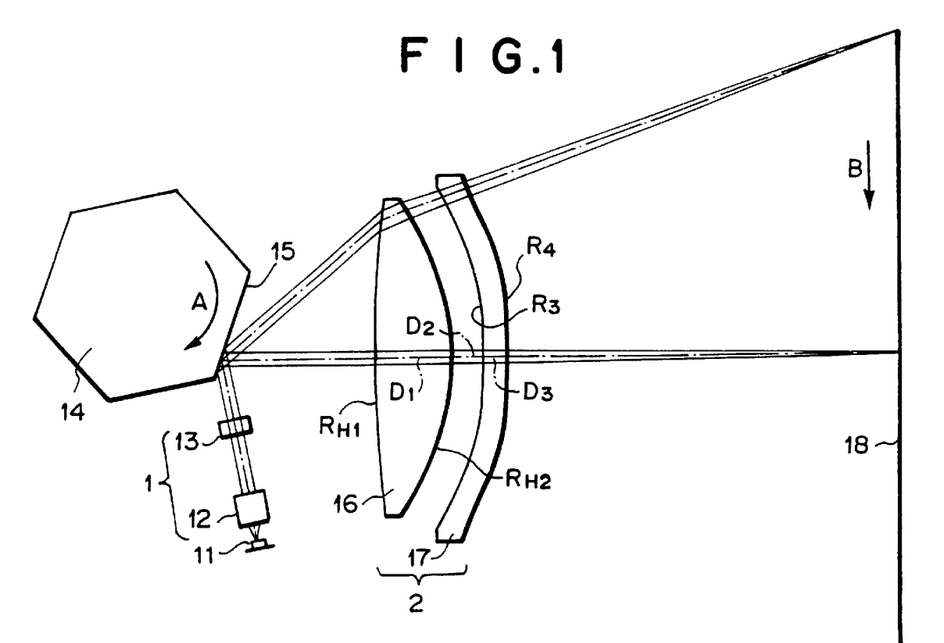
FIG. 1 is a sectional view in the main scanning direction showing the configuration of the light-scanning optical system in accordance with an embodiment of the present invention.

FIG. 1 shows the configuration of the light-scanning optical system in accordance with an embodiment of the present invention, and is a schematic view showing the cross section in the main scanning direction including the optical axis (hereinafter referred to as main scanning direction cross section).

As shown in FIG. 1, this light-scanning optical system comprises a first optical means 1 for forming, in the main scanning direction, a linear image of a light beam emitted from a light source 11; a polygon mirror 14, which is a light-deflecting means, having a deflecting/reflecting surface 15 near the image-forming position of the first optical means 1, for reflecting and deflecting the light beam so as to scan a surface to be scanned 18; and a second optical means 2 which operates so as to form an image of the light beam reflected and deflected by the polygon mirror 14 onto the surface to be scanned 18 and scan the light beam at substantially a constant speed on the surface 18.

The first optical means 1 comprises a collimating lens 12 for turning the light beam emitted from the light source 11 into substantially parallel light, and a cylindrical lens 13 having a positive refracting power in the sub-scanning direction for forming the linear image of the light beam. The second optical means 2 is constituted by two lenses, i.e., a first lens 16 having a positive refracting power in each of the main scanning and sub-scanning directions, whose both sides respectively directed onto the deflecting/reflecting surface 15 and the surface to be scanned 18 are toric surfaces each having different refractive powers in the main scanning direction cross section and sub-scanning direction cross section; and a second lens 17 made of an aspherical lens having a small negative refracting power or no refracting power, in which at least one surface is of rotational symmetry (symmetric aspheric surface) about the optical axis.

Figure 2:
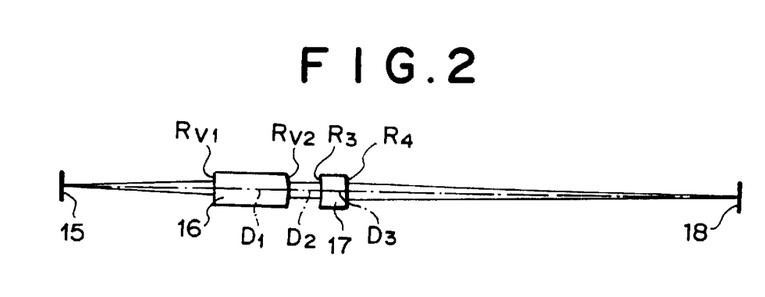
FIG. 2 is a sectional view in the sub-scanning direction showing the configuration of the light-scanning optical system in accordance with the above-mentioned embodiment.

FIG. 2 shows the basic configuration of the second optical means 2 from the deflecting/reflecting surface 15 to the surface to be scanned 18 in this embodiment in the plane (sub-scanning direction cross section), including the optical axis, perpendicular to the main scanning direction cross section.

In FIGS. 1 and 2, the light beam emitted from the light source 11 is focused onto the surface to be scanned 18, and is subjected to main scanning in the direction of arrow B on the surface 18 as the polygon mirror 14 rotates in the direction of arrow A. As being transmitted through the second optical means 2, the light beam is subjected to main scanning at substantially a constant speed on the surface 18. Further, the surface 18 is moved in the sub-scanning direction, so as to form an image. The deflecting/reflecting surface 15 and the surface to be scanned 18 are conjugate with each other with respect to the second optical means 2 in the sub-scanning direction cross section, whereby a correcting function for the surface tilt of the deflecting/ reflecting surface 15 can optically be obtained.

Here, the sub-scanning direction is a relative moving direction of the surface to be scanned 18 and the scanning light beam. The scanning light beam may be moved while the surface to be scanned 18 is kept stationary.

As mentioned above, the second optical means 2 is constituted by two lenses, i.e., the first lens 16 having a positive refracting power in each of the main scanning and sub-scanning directions, whose both sides are toric surfaces; and the second lens 17 made of an aspherical lens having a small negative refracting power or no refracting power, in which at least one surface is of rotational symmetry about the optical axis. As a lens having toric surfaces on both sides is employed as the first lens 16, a single lens can attain effects on a par with those of a plurality of cylindrical lenses whose refracting power directions are different from each other. Also, as the refracting power of the second lens 17 in the main scanning direction is set to a small negative value or zero, a sufficient distance can be attained between the second lens 17 and the surface to be scanned 18.

Such a configuration of the second optical means 2 can be effective in that the small number of lens elements, i.e., only two lens elements, can suppress the unevenness in beam waist in the sub-scanning direction among the scans caused by the angle of tilting of the deflecting/reflecting surface 15 of the polygon mirror 14, and can keep the image surface curvature favorable in the main scanning and sub-scanning directions. As favorable imaging performances are obtained even with a small number of components, the light-scanning optical system can simplify its configuration, realize a large scanning angle, and respond to higher density.

Explained in the following are effects obtained when a semiconductor laser having a wavelength of 500 nm or shorter is used as the light source 11 of the light-scanning optical system.

When the light source 11 has such a short wavelength, then the light spot on the surface to be scanned 18 can have a smaller size without broadening the aperture, whereby the formed image can attain a higher density.

Letting the light spot size be d, the wavelength be λ, and the F-number be F; then there is a relationship of d=k·F·λ (where k is a constant). This relationship indicates that, for reducing the light spot size, it will theoretically be sufficient if F or λ is made smaller. Here, if F is to be lowered, then a lens having a larger aperture is necessary as mentioned above, thus contradicting the reduction in size of the optical system. Also, since the scanning lens becomes complicated, it would be difficult to lower the cost.

Therefore, a light-scanning optical system using a light source which lowers λ, i.e., with a shorter wavelength, is effective. As a laser having a short wavelength, Ar$^+$ laser, He-Cd laser, and the like have conventionally been known, and optical systems using them exist. However, the Ar$^+$ laser, He-Cd laser, and the like are expensive and have large dimensions, thus being unsuitable for attaining a smaller size or lower cost. On the other hand, as semiconductor lasers having a shorter wavelength have recently been developed, a high-density optical system can be provided at a low cost by using them.

For example, if a conventional light-scanning optical system yields a printing density on the order of 600 dots per inch by using a semiconductor laser with a wavelength of 700 nm as the light source, using a semiconductor laser with a wavelength of 480 nm will yield a light spot size of d (480 nm)=d (780 nm)×480/780, and a printing density of 600× 780/480=980. Thus, using a semiconductor laser with a shorter wavelength enables high-density printing on the order of 1000 dots per inch without lowering the F-number.

Thus, when the wavelength of the light source 11 is set to 500 nm or shorter, then the image can attain a higher density without lowering F. As a consequence, a plastic lens can be used in the light-scanning optical system of the present invention equipped with such a light source 11. As mentioned above, since favorable performances are hard to attain in the peripheral portion of plastic lenses, it is difficult for the plastic lenses to broaden the aperture relative to the lens diameter, whereby the plastic lenses have been unsuitable for optical systems which necessitate a lens having a small F-number for achieving a high density.

If a lens which is hard to process and likely to become expensive when made of glass is made of plastic, then the optical system can further reduce its size and cost. Even when only one plastic lens is used, the size and cost can be lowered.

In the following, examples of the light-scanning optical system in accordance with the present invention will be explained with reference to specific values.

EXAMPLE 1

The light-scanning optical system in accordance with Example 1 is configured as shown in FIG. 1. While this configuration conforms to that explained in the above-mentioned embodiment, the light emitted from the light source 11 has a wavelength of 780 nm, both of the first lens 16 and second lens 17 are made of plastic, and the second lens 17 has a small negative refracting power with each of both surfaces being made of an aspheric surface which is of rotational symmetry about the optical axis. The aspheric surface forms of the second lens 17 are represented by the following aspheric surface equation. The same aspheric surface equation is used in the following examples as well.

$$Z(Y) = \frac{Y^2}{R\left(1 + \sqrt{1 - K(Y/R)^2}\right)} + \sum_{i=2}^{5} A_{2i} Y^{2i}$$

where

Z is the length (mm) of the perpendicular to the tangential plane (plane perpendicular to the optical axis) of an apex of the aspheric surface from a point on the aspheric surface at a height Y from the optical axis;

Y is the height (mm) from the optical axis;

R is the paraxial radius of curvature of the aspheric surface;

K is the eccentricity; and $A_{2i}$ is the aspheric surface coefficient of the 2i-th order.

Table 1 shows the radius of curvature $R_H$, $R_V$, R of each lens surface (in which $R_H$ is the radius of curvature of each toric surface in the main scanning direction cross section, $R_V$ is the radius of curvature of each toric surface in the sub-scanning direction, and the unit of radius of curvature is mm, as with the following examples), air space D (mm) of each lens, and refractive index $N_e$ and Abbe number $v_e$ of each lens at e-line (λ=546.1 nm) in Example 1. Here, in Table 1 as well as Tables 3, 5, and 7 which will be explained later, the numbers indicating the letters R, D, $N_e$, and $v_e$ successively increase from the light source side.

The lower part of Table 1 indicates the respective values of the wavelength λ of the light source 11, F-number of the second optical means 2, half angle of view ω, and focal length f in the light-scanning optical system of Example 1.

In Table 1 and the following tables, each surface to which "*" is attached on the right side refers to an aspheric surface, and the radius of curvature R of the aspheric surface is a value of the radius of curvature in the vicinity of the optical axis.

Table 2 shows the values of constants K, $A_4$, $A_6$, $A_8$, and $A_{10}$ of the aspheric surfaces indicated by the above-mentioned aspheric surface equation in Example 1.

Figure 3A:
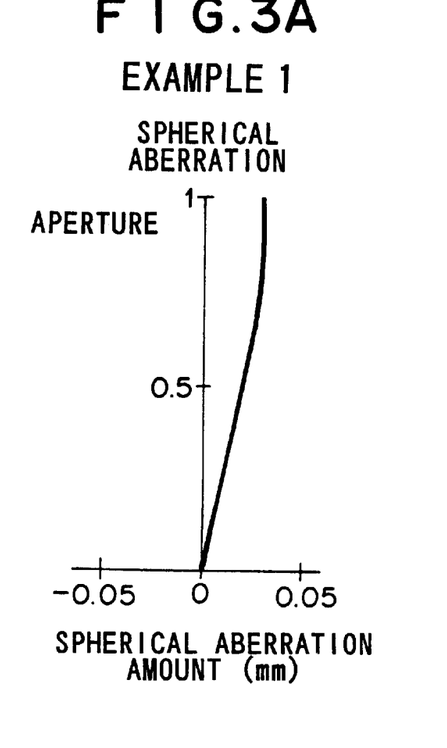
FIGS. 3A to 3C are aberration charts of the light-scanning optical system in accordance with Example 1.
Figure 3B:
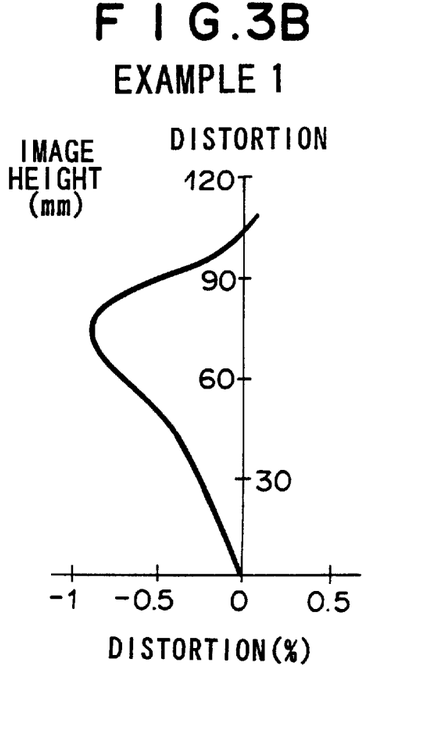
Figure 3C:
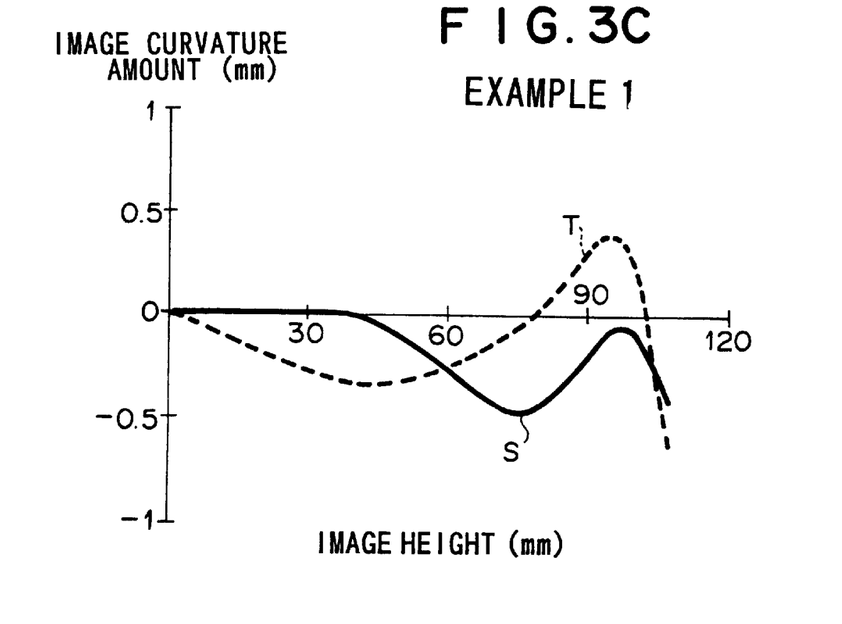

FIG. 3 shows the aberration charts (showing spherical aberration, distortion, and image surface curvature) of the light-scanning optical system in accordance with Example 1. Here, the spherical aberration chart in each of FIGS. 3 to 6 is normalized with F-number=42 being set to 1, whereas each astigmatism chart shows the respective aberrations with respect to sagittal (S) and tangential (T) image surfaces.

As can be seen from Table 1 and FIG. 3, Example 1 makes each kind of aberration such as image surface curvature favorable and attains good imaging performances with a small number of constituent elements, i.e., two elements, so as to achieve a large scanning angle, thereby yielding a light-scanning optical system which can respond to higher density as well.

EXAMPLE 2

The configuration of the light-scanning optical system in accordance with Example 2 is substantially the same as that of Example 1 except that a semiconductor laser having a wavelength of 480 nm is used as its light source 11.

Table 3 shows the radius of curvature $R_H$ (mm), $R_V$ (mm), R (mm) of each lens surface, air space D (mm) of each lens, and refractive index $N_e$ and Abbe number $v_e$ of each lens at e-line in Example 2. The lower part of Table 3 indicates the respective values of the wavelength λ of the light source 11, F-number of the second optical means 2, half angle of view ω, and focal length f in the light-scanning optical system of Example 2.

Table 4 shows the values of constants K, $A_4$, $A_6$, $A_8$, and $A_{10}$ of the aspheric surfaces in Example 2.

Figure 4A:
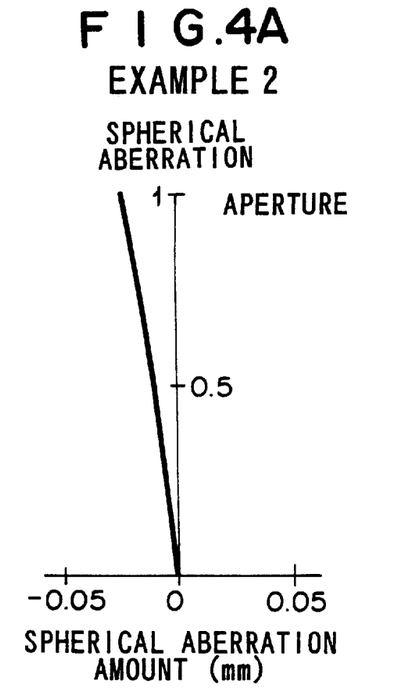
FIGS. 4A to 4C are aberration charts of the light-scanning optical system in accordance with Example 2.
Figure 4B:
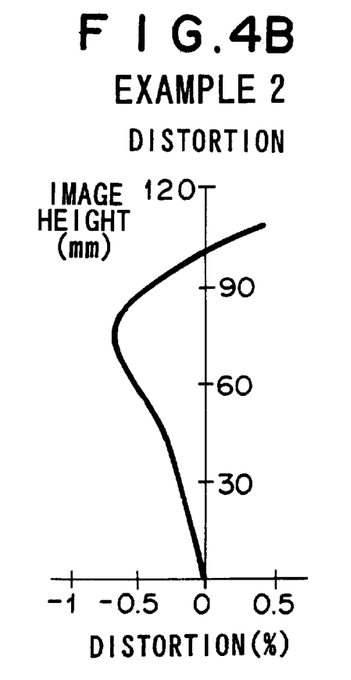
Figure 4C:
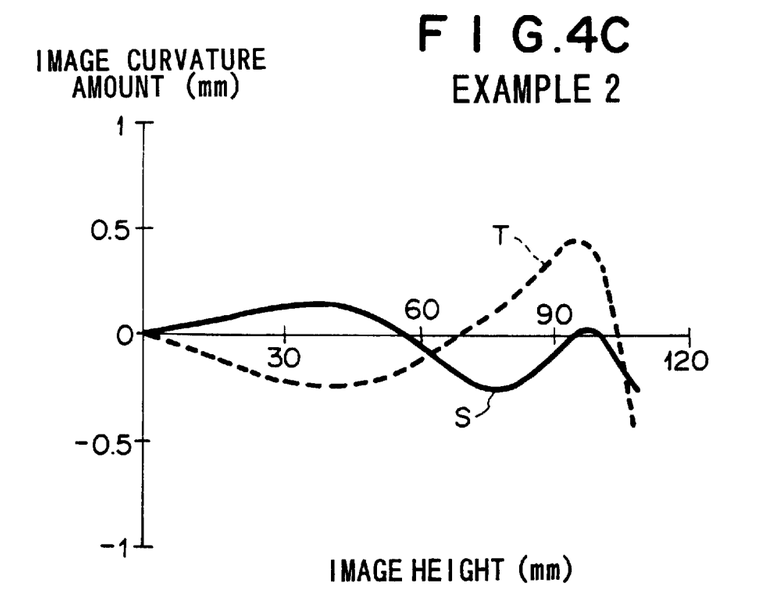

FIG. 4 shows the aberration charts (showing spherical aberration, distortion, and image surface curvature) of the light-scanning optical system in accordance with Example 2.

As can be seen from Table 3 and FIG. 4, Example 2 makes each kind of aberration such as image surface curvature favorable and attains good imaging performances with a small number of constituent elements, i.e., two elements, so as to achieve a large scanning angle. Further, as a semiconductor laser having a shorter wavelength is used, higher-density printing is possible without lowering the F-number. Also, as the lenses are made of plastic, the optical system can attain a further smaller size and lower cost.

EXAMPLE 3

Though the configuration of the light-scanning optical system in accordance with Example 3 is substantially the same as that of Example 2, the wavelength of the light source 11 is 450 nm, and the refracting power of the second lens 17 is weaker than that in the above-mentioned Examples 1 and 2.

Table 5 shows the radius of curvature $R_H$ (mm), $R_V$ (mm), R (mm) of each lens surface, air space D (mm) of each lens, and refractive index $N_e$ and Abbe number $v_e$ of each lens at e-line in Example 3. The lower part of Table 5 indicates the respective values of the wavelength λ of the light source 11, F-number of the second optical means 2, half angle of view ω, and focal length f in the light-scanning optical system of Example 3.

Table 6 shows the values of constants K, $A_4$, $A_6$, $A_8$, and $A_{10}$ of the aspheric surfaces in Example 3.

Figure 5A:
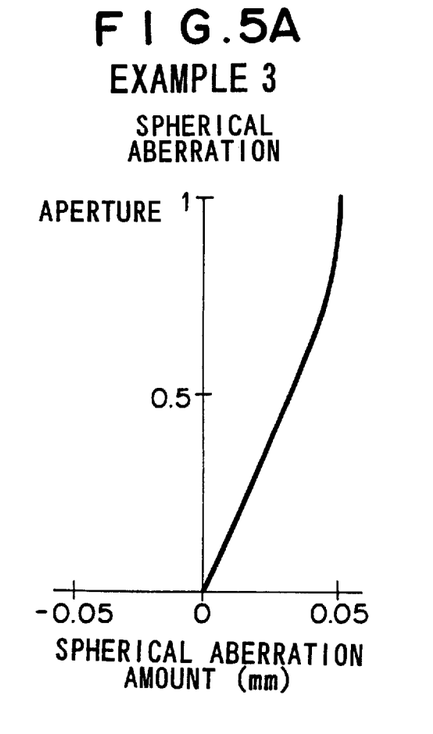
FIGS. 5A to 5C are aberration charts of the light-scanning optical system in accordance with Example 3.
Figure 5B:
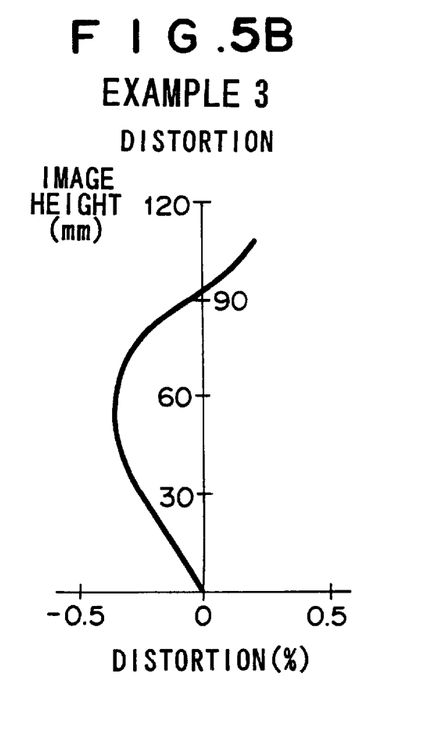
Figure 5C:
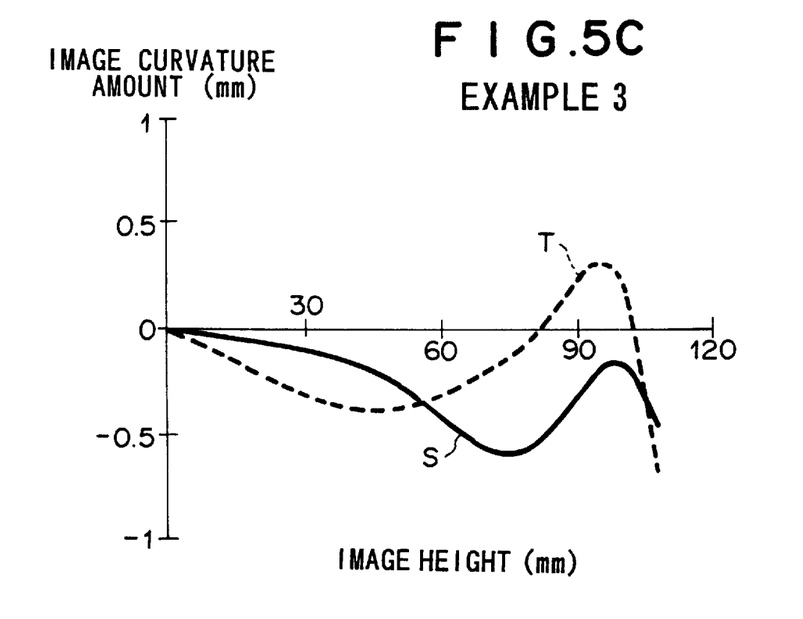

FIG. 5 shows the aberration charts (showing spherical aberration, distortion, and image surface curvature) of the light-scanning optical system in accordance with Example 3.

As can be seen from Table 5 and FIG. 5, Example 3 makes each kind of aberration such as image surface curvature favorable and attains good imaging performances with a small number of constituent elements, i.e., two elements, so as to achieve a large scanning angle. Further, as a semiconductor laser having a shorter wavelength is used, higher-density printing is possible without lowering the F-number. Also, as the lenses are made of plastic, the optical system can attain a further smaller size and lower cost.

EXAMPLE 4

Though the configuration of the light-scanning optical system in accordance with Example 4 is substantially the same as that of Example 2, the wavelength of the light source 11 is 400 nm, and the refracting power of the second lens 17 is weaker than that in the above-mentioned Examples 1 and 2 as with Example 3.

Table 7 shows the radius of curvature $R_H$ (mm), $R_V$ (mm), R (mm) of each lens surface, air space D (mm) of each lens, and refractive index $N_e$ and Abbe number $\lambda_e$ of each lens at e-line in Example 4. The lower part of Table 7 indicates the respective values of the wavelength λ of the light source 11, F-number of the second optical means 2, half angle of view ω, and focal length f in the light-scanning optical system of Example 4.

Table 8 shows the values of constants K, $A_4$, $A_6$, $A_8$, and $A_{10}$ of the aspheric surfaces in Example 4.

Figure 6A:
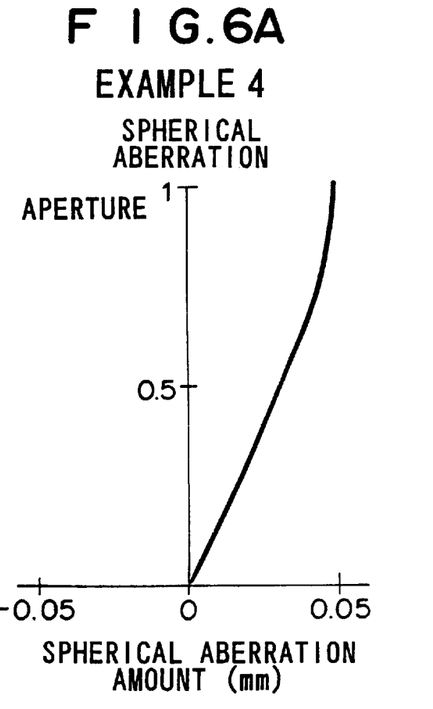
FIGS. 6A to 6C are aberration charts of the light-scanning optical system in accordance with Example 4.
Figure 6B:
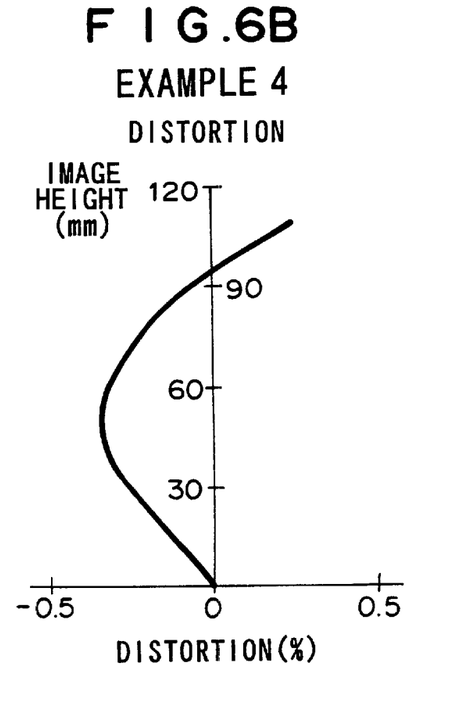
Figure 6C:
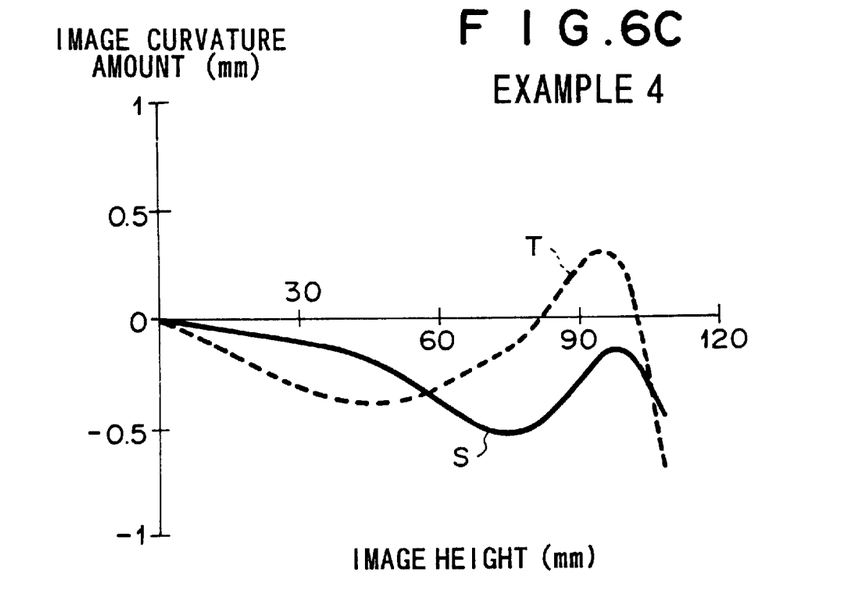
Figure 7A:
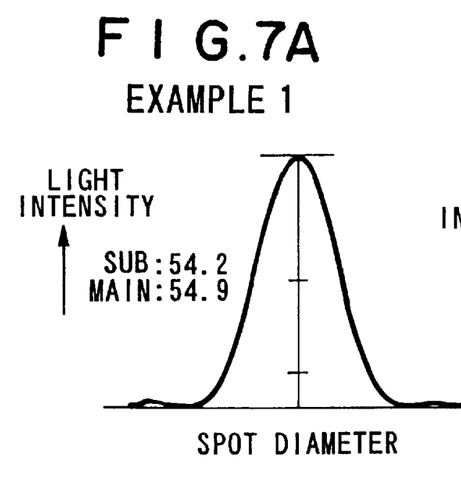
FIGS. 7A to 7D are sectional views showing the spot forms of the light-scanning optical systems in accordance with Examples 1 to 4, respectively.
Figure 7B:
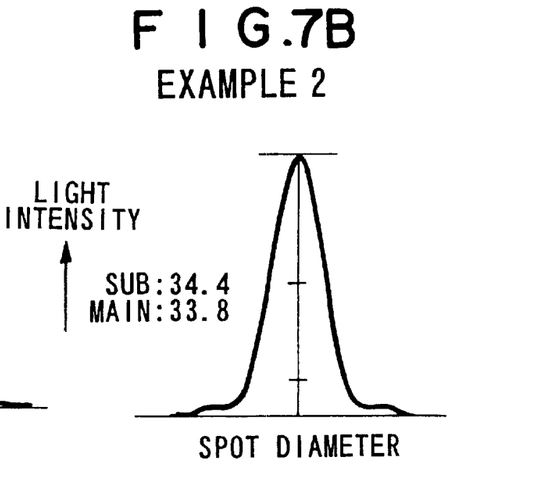
Figure 7C:
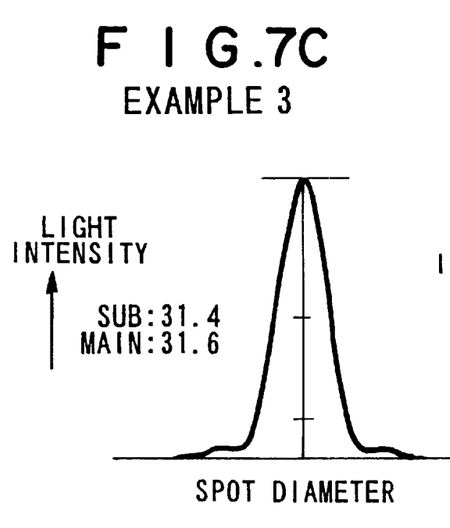
Figure 7D:
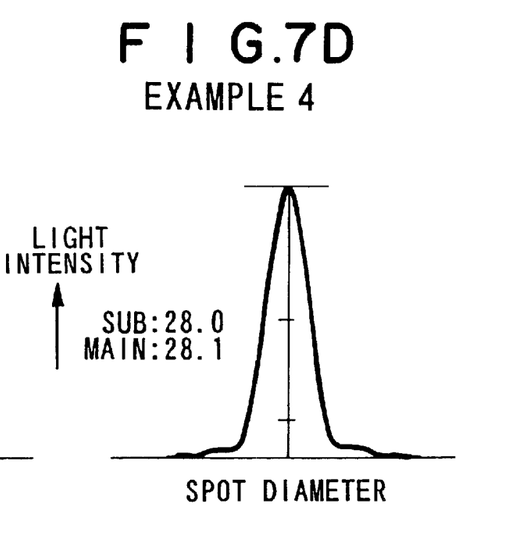

FIG. 6 shows the aberration charts (showing spherical aberration, distortion, and image surface curvature) of the light-scanning optical system in accordance with Example 4.

As can be seen from Table 7 and FIG. 6, Example 4 makes each kind of aberration such as image surface curvature favorable and attains good imaging performances with a small number of constituent elements, i.e., two elements, so as to achieve a large scanning angle. Further, as a semiconductor laser having a shorter wavelength is used, higher-density printing is possible without lowering the F-number. Also, as the lenses are made of plastic, the optical system can attain a further smaller size and lower cost.

FIGS. 7A to 7D show the respective spot forms in Examples 1 to 4. Each chart indicates the light intensity at the center angle of view in its corresponding Example by an arbitrary unit. The upper and lower numerical values in each chart refer to the respective spot diameters (mm) in the sub-scanning and main scanning directions. As FIGS. 7A to 7D indicate, Examples 2 to 4 each having a light source wavelength of 500 nm or shorter can yield a smaller spot diameter, thereby allowing the image to have a higher density and performances to improve.

Without being restricted to the above-mentioned embodiment, the lens system constituting the light-scanning optical system of the present invention can be changed in various manners. For example, the radius of curvature $R_H$, $R_V$, R of each lens and the lens space (or lens thickness) D can appropriately be changed. Also, though the second lens 17 in the second optical means 2 is a lens in which at least one surface is an aspheric surface of rotational symmetry (symmetric aspherical surface), a lens in which at least one surface is represented by a desirable function of higher order only in the main scanning direction cross section may be used instead.

The aspheric surface of rotational symmetry (symmetrical aspherical surface) is also described as a lens form which overlaps the original form when it is rotated a predetermined angle around a predetermined center point.

As explained in the foregoing, in the light-scanning optical system of the present invention, the second optical means disposed between the deflecting/reflecting surface and the surface to be scanned is constituted, successively from the deflecting/reflecting surface side, by a first lens having a positive refracting power in each of the main scanning and sub-scanning direction, in which each of both sides has a toric surface; and a second lens having a small negative refracting power or no refracting power in the main scanning direction, in which at least one surface is made of a non-arc surface whose main scanning direction cross section is represented by a function of higher order. Consequently, a large scanning angle can be attained by a small number of constituent elements, i.e., two elements, whereby the light-scanning optical system can respond to higher density. Further, when a semiconductor laser having a shorter wavelength is used as the light source, higher-density printing is possible without lowering the F-number. Also, when the lenses are made of plastic, the optical system can attain a further smaller size and lower cost.

TABLE 1

Example 1

| Surface | | R | D | $N_e/\nu_e$ |
|---|---|---|---|---|
| 1 | $R_{H1}$ | 435.85 | 25.0 | 1.5263/51.0 |
| | $R_{V1}$ | −130.89 | | |
| 2 | $R_{H2}$ | −89.158 | 10.7 | |
| | $R_{V2}$ | −21.552 | | |
| 3* | $R_3$ | −468.42 | 8.0 | 1.5263/51.0 |
| 4* | $R_4$ | −591.35 | | |
| | $\lambda$ = 780 nm | F/NO = 42 | $\omega$ = 36° | f = 150 |

TABLE 2

| Aspheric surface coefficient | | |
|---|---|---|
| 3rd surface | K = 56.37530 | |
| | $A_4 = -3.018566 \times 10^{-6}$ | $A_6 = 7.272536 \times 10^{-10}$ |
| | $A_8 = 4.774921 \times 10^{-14}$ | $A_{10} = -2.333778 \times 10^{-17}$ |
| 4th surface | K = 21.17244 | |
| | $A_4 = -2.697782 \times 10^{-6}$ | $A_6 = 5.634564 \times 10^{-10}$ |
| | $A_8 = 5.249469 \times 10^{-14}$ | $A_{10} = -1.832400 \times 10^{-17}$ |

TABLE 3

Example 2

| Surface | | R | D | $N_e/\nu_e$ |
|---|---|---|---|---|
| 1 | $R_{H1}$ | 391.43 | 25.0 | 1.5263/51.0 |
| | $R_{V1}$ | −134.38 | | |
| 2 | $R_{H2}$ | −90.329 | 12.0 | |
| | $R_{V2}$ | −21.922 | | |
| 3* | $R_3$ | −301.91 | 8.0 | 1.5263/51.0 |
| 4* | $R_4$ | −419.44 | | |

TABLE 3-continued

Example 2

| Surface | R | D | $N_e/\nu_e$ |
|---|---|---|---|
| $\lambda$ = 480 nm | F/NO = 42 | $\omega$ = 36° | f = 150 |

TABLE 4

| Aspheric surface coefficient | | |
|---|---|---|
| 3rd surface | K = 23.62347 | |
| | $A_4 = -2.768799 \times 10^{-6}$ | $A_6 = 7.425674 \times 10^{-10}$ |
| | $A_8 = 4.788649 \times 10^{-14}$ | $A_{10} = -2.414006 \times 10^{-17}$ |
| 4th surface | K = 10.41939 | |
| | $A_4 = -2.456874 \times 10^{-6}$ | $A_6 = 5.582930 \times 10^{-10}$ |
| | $A_8 = 5.514555 \times 10^{-14}$ | $A_{10} = -1.949040 \times 10^{-17}$ |

TABLE 5

Example 3

| Surface | | R | D | $N_e/\nu_e$ |
|---|---|---|---|---|
| 1 | $R_{H1}$ | 671.28 | 25.0 | 1.5263/51.0 |
| | $R_{V1}$ | −121.38 | | |
| 2 | $R_{H2}$ | −89.440 | 6.95 | |
| | $R_{V2}$ | −22.105 | | |
| 3* | $R_3$ | −292.97 | 8.0 | 1.5263/51.0 |
| 4* | $R_4$ | −295.85 | | |
| | $\lambda$ = 450 nm | F/NO = 42 | $\omega$ = 36° | f = 150 |

TABLE 6

| Aspheric surface coefficient | | |
|---|---|---|
| 3rd surface | K = 21.33275 | |
| | $A_4 = -2.705206 \times 10^{-6}$ | $A_6 = 6.910736 \times 10^{-10}$ |
| | $A_8 = 4.157222 \times 10^{-14}$ | $A_{10} = -2.316367 \times 10^{-17}$ |
| 4th surface | K = 4.17327 | |
| | $A_4 = -2.419084 \times 10^{-6}$ | $A_6 = 5.007355 \times 10^{-10}$ |
| | $A_8 = 5.590693 \times 10^{-14}$ | $A_{10} = -1.931059 \times 10^{-17}$ |

TABLE 7

Example 4

| Surface | | R | D | $N_e/\nu_e$ |
|---|---|---|---|---|
| 1 | $R_{H1}$ | 747.30 | 25.0 | 1.5263/51.0 |
| | $R_{V1}$ | −119.39 | | |
| 2 | $R_{H2}$ | −89.710 | 7.09 | |
| | $R_{V2}$ | −22.289 | | |
| 3* | $R_3$ | −290.40 | 8.0 | 1.5263/51.0 |
| 4* | $R_4$ | 293.23 | | |
| | $\lambda$ = 400 nm | F/NO = 42 | $\omega$ = 360 | f = 150 |

TABLE 8

| Aspheric surface coefficient | | |
|---|---|---|
| 3rd surface | K = 20.95929 | |
| | $A_4 = -2.683390 \times 10^{-6}$ | $A_6 = 6.866545 \times 10^{-10}$ |
| | $A_8 = 4.127587 \times 10^{-14}$ | $A_{10} = 2.325870 \times 10^{-17}$ |
| 4th surface | K = 3.32396 | |
| | $A_4 = -2.405935 \times 10^{-6}$ | $A_6 = 4.966343 \times 10^{-10}$ |
| | $A_8 = 5.518449 \times 10^{-14}$ | $A_{10} = -1.928675 \times 10^{-17}$ |

What is claimed is:

1. A light-scanning optical system comprising:

a light source using a semiconductor laser having a wavelength of 500 nm or shorter;

first optical means for forming a linear image of a light beam from said light source;

light-deflecting means, having a light-deflecting surface at or near an imaging position of said first optical means, for deflecting said light beam so as to scan a surface to be scanned; and second optical means, including at least one plastic lens, for causing said light beam deflected by said light-deflecting means to form an image on said surface to be scanned and scan said surface at substantially a constant speed.

2. A light-scanning optical system in accordance with claim wherein said second optical means is constituted, successively from said light deflecting means side, by:

a first lens having a positive refracting power on each main scanning and sub-scanning directions, each of both sides thereof having a toric surface; and a second lens having a small negative refracting power or no refracting power in said main scanning direction, at least one surface thereof being made of a non-arc surface whose cross section in said main scanning direction is represented by a function of eighth order or higher.

3. A light-scanning optical system according to claim 1, wherein said second optical means is constituted successively from said light deflecting means side, by;

a first lens having a positive refracting power on each of main scanning and sub-scanning directions, each of both sides having a toric surface; and a second lens having a small negative refracting power or no refracting power in said main scanning direction and at least one surface thereof being made of a symmetric aspheric surface.

* * * * *

UNITED STATES PATENT AND TRADEMARK OFFICE
CERTIFICATE OF CORRECTION

PATENT NO. : 6,670,980 B1  Page 1 of 1
DATED : December 30, 2003
INVENTOR(S) : Tetsuya Ori It is certified that error appears in the above-identified patent and that said Letters Patent is hereby corrected as shown below:

Column 11,
Line 19, after "claim" insert -- 1, --

Signed and Sealed this

Sixth Day of April, 2004

JON W. DUDAS
*Acting Director of the United States Patent and Trademark Office*